United States Patent
Zhu et al.

(10) Patent No.: US 9,102,854 B2
(45) Date of Patent: Aug. 11, 2015

(54) POLYURETHANE SEALANT COMPOSITIONS HAVING HIGH FILLER LEVELS

(75) Inventors: Huide D. Zhu, Rochester, MI (US); Jeffrey W. Saracsan, Waterford, MI (US); Frank V. Billotto, Oakland, MI (US); Michael Frishcosy, Rochester, MI (US)

(73) Assignee: DOW GLOBAL TECHNOLOGIES INC., Midland, MI (US)

( * ) Notice: Subject to any disclaimer, the term of this patent is extended or adjusted under 35 U.S.C. 154(b) by 1117 days.

(21) Appl. No.: 12/249,030

(22) Filed: Oct. 10, 2008

(65) Prior Publication Data

US 2009/0114336 A1    May 7, 2009

Related U.S. Application Data

(60) Provisional application No. 60/986,093, filed on Nov. 7, 2007.

(51) Int. Cl.
| | | |
|---|---|---|
| B32B 17/10 | (2006.01) | |
| B32B 17/06 | (2006.01) | |
| C08L 75/04 | (2006.01) | |
| C09J 175/04 | (2006.01) | |
| C08G 18/12 | (2006.01) | |

(52) U.S. Cl.
CPC ............. *C09J 175/04* (2013.01); *C08G 18/12* (2013.01)

(58) Field of Classification Search
CPC .......... B32B 17/10; B32B 17/06; C08L 75/04
USPC ............................................ 156/99; 524/871
See application file for complete search history.

(56) References Cited

U.S. PATENT DOCUMENTS

| | | | |
|---|---|---|---|
| 3,391,101 A | 7/1968 | Kelly et al. | |
| 3,707,521 A | 12/1972 | De Santis | |
| 3,779,794 A | 12/1973 | De Santis | |
| 3,895,043 A | 7/1975 | Wagner et al. | |
| 3,933,725 A | 1/1976 | Dearlove et al. | |
| 4,345,053 A | 8/1982 | Rizk et al. | |
| 4,374,237 A | 2/1983 | Berger et al. | |
| 4,525,511 A | 6/1985 | Kirby et al. | |
| 4,623,709 A | 11/1986 | Bauriedel | |
| 4,625,012 A | 11/1986 | Rizk et al. | |
| 4,687,533 A | 8/1987 | Rizk et al. | |
| 4,857,623 A | 8/1989 | Emmerling et al. | |
| 4,910,255 A | 3/1990 | Wakabayashi et al. | |
| 4,910,279 A | 3/1990 | Gillis et al. | |
| 5,370,905 A | 12/1994 | Varga et al. | |
| 5,441,808 A | 8/1995 | Anderson et al. | |
| 5,623,044 A | 4/1997 | Chiao | |
| 5,741,383 A * | 4/1998 | Kneisel .......................... 156/108 | |
| 5,747,581 A | 5/1998 | Proebster et al. | |
| 5,817,860 A | 10/1998 | Rizk et al. | |
| 5,852,137 A | 12/1998 | Hsieh et al. | |
| 5,880,167 A | 3/1999 | Krebs et al. | |
| 5,922,809 A | 7/1999 | Bhat et al. | |
| 6,015,475 A | 1/2000 | Hsieh et al. | |
| 6,053,971 A | 4/2000 | Lin | |
| 6,255,433 B1 | 7/2001 | Kuroda et al. | |
| 6,280,561 B1 | 8/2001 | McInnis et al. | |
| 6,319,311 B1 | 11/2001 | Katz et al. | |
| 6,355,127 B1 | 3/2002 | Mahdi et al. | |
| 6,362,300 B1 | 3/2002 | Araki et al. | |
| 6,410,640 B1 | 6/2002 | Fukunaga et al. | |
| 6,512,033 B1 * | 1/2003 | Wu .............................. 524/128 | |
| 6,515,164 B1 | 2/2003 | Bolte et al. | |
| 6,809,171 B2 | 10/2004 | Bolte et al. | |
| 7,345,130 B2 | 3/2008 | Zhu et al. | |
| 2003/0009049 A1 | 1/2003 | Smith et al. | |
| 2003/0024639 A1 | 2/2003 | Paulsen et al. | |
| 2003/0144412 A1 | 7/2003 | Miyata et al. | |
| 2004/0122253 A1 | 6/2004 | Smith et al. | |
| 2004/0143055 A1 | 7/2004 | Nakata et al. | |
| 2004/0204536 A1 | 10/2004 | Miyatani et al. | |
| 2006/0183846 A1 | 8/2006 | Pfenninger et al. | |
| 2006/0270807 A1 | 11/2006 | Zhu et al. | |
| 2008/0041522 A1 | 2/2008 | Zhu et al. | |

FOREIGN PATENT DOCUMENTS

| | | |
|---|---|---|
| CA | 2608744 | 12/2006 |
| JP | 11-181400 A | 7/1999 |
| JP | 2001279221 | 10/2001 |
| JP | 2008-050389 | 3/2008 |

OTHER PUBLICATIONS

Honda, Akihiro, et al. "One-liquid moisture-curable elastic adhesive compositions." (Aica Kogyo Co., Ltd., Japan). Jpn. Kokai Tokkyo Koho (2006), abstract.

Wakaume, Tomokazu, et al. "Moisture-curable polyurethane adhesive compositions with fast curability at low temperature, long pot life, and good storage stability." (Cemedine Co., Ltd., Japan). Jpn. Kokai Tokkyo Koho (2006), abstract.

Hasegawa Yutaka; et al. "Volatile organic compound-free-one-component moisture-curable polyurethane adhesive compositions with good workability and low-temperature storage stability." (Aica Kogyo Co. Ltd japan) Jpn. Kokai Tokkyo Koho, (2005) abstract.

Matsuda, Hideyuki; et al. "Adhesive composition for mounting automobile interior." (Yokohama Rubber Co., Ltd., Japan; Nissan Motor Co., Ltd.). (Jpn. Kokai Tokkyo Koho) (2003). abstract.

Matsuda, Hideyuki et al., "Adhesive composition for mounting automobile interior." (Yokohama Rubber Co., Ltd., Japan; Nissan Motor Co., Ltd.). Jpn. Kokai Tokkyo Koho (2003), abstract.

(Continued)

*Primary Examiner* — Daniel Lee

(74) *Attorney, Agent, or Firm* — The Dobrusin Law Firm, P.C.

(57) ABSTRACT

In one aspect, this invention is a composition comprising a urethane prepolymer having isocyanate moieties; a catalytic amount of a compound which catalyzes the reaction of isocyanate moieties with water or an active hydrogen containing compound; and untreated calcium carbonate as filler. The composition of the invention can be used to bond a window into a structure especially for the automobile windshield installation with good adhesion strength and durability.

16 Claims, No Drawings

(56) References Cited

OTHER PUBLICATIONS

Matsumiya, Hisao, "One-liquid moisture-curable polyurethane adhesive compositions with good adhesion to low-polarity substrates." (Hitachi Kasei Polymer Co., Ltd., Japan). Jpn. Kokai Tokkyo Koho (2002), abstract.

Safuku, Takahiro; "One-liquid moisture-curable polyurethane sealing compositions with good storage stability and thixotropy and their manufacture." (Yokohama Rubber Co., Ltd., Japan). Jpn. Kokai Tokkyo Koho (2002), abstract.

Safuku, Takahiro, "One—pot moisture-curable polyurethane sealants containing modified calcium carbonate." (Yokohama Ruber Co., Ltd., Japan). Jpn. Kokai Tokkyo Koho (2000), abstract.

Lear, Jeff, et al.. "The use of experimental design to predict properties of polyurethane sealants." South Charleston Technical Center, Lyondell Chemical Company, South Charleston, WV, USA. Polyurethanes Expo'99, Proceedings of the Polyurethanes Expo'99, Orlando FL, United States, Sep. 12-15, 1999, Publisher: Technomic Publishing Co., Inc., Lancaster, PA., abstract.

Araki, Kiminori. "One-liquid moisture—curable sealant compositions with good balance of storage stability and curability." (Yokohama Rubber Co., Ltd., Japan). Jpn. Kokai Tokkyo Koho (1999), abstract.

Nakata, Yoshihiro; "Moisture-curable one-pack type urethane adhesive compositions for automobiles." (Sunstar Giken Kabushiki Kaisha, Japan; Uni-Sunstar B.V.). PCT Int. Appl. (2001), abstract.

Wacker Silicones, Geniosil STP-E-35, pp. 1-2, Trimethoxsilylcamarererminated polyether, CAS 216597-12-5.

Wacker Silicones, Geniosil STP-E 10, pp. 1-2, Dimethoxy(methyl)silylmethylcarbamate-terminated polyether. CAS 611222-18-5.

Wacker, Silicones, Geniosil, One Step Ahead Organofunctional Silanes from Wacker, Creating Tomorrow's Solutions, pp. 1-32.

* cited by examiner

POLYURETHANE SEALANT COMPOSITIONS HAVING HIGH FILLER LEVELS

CLAIM OF PRIORITY

This application claims priority from provisional application Ser. No. 60/986,093, filed on Nov. 7, 2007, which is incorporated herein by reference.

FIELD OF INVENTION

This invention relates to polyurethane sealant compositions which are capable of being used to bond glass into structures. The invention further relates to the use of such compositions to bond substrates together, such as windows into structures.

BACKGROUND OF THE INVENTION

Polyurethane sealant compositions typically comprise at least one urethane prepolymer. Adhesives useful for bonding to non-porous substrates, such as glass are described, for example, in U.S. Pat. No. 4,374,237 and U.S. Pat. No. 4,687,533, both incorporated herein by reference. Window installation in a vehicle is typically a three-stage process. First, a clear silane primer is applied to the glass to clean and prepare the surface for bonding. Second, a primer, which is essentially a carbon black dispersion which also contains a compound having silane and/or isocyanate functionality, often referred to as "black-out primer", is then applied over the top of the clear primer. Third, an adhesive is applied to the primed glass which is then installed into the structure. For vehicles and some buildings, these materials are applied to a frit of a ceramic enamel or an organic coating located about the periphery of the window. The frit is designed to protect the adhesive from exposure to UV light and to hide the adhesive and/or trim components from view, see, U.S. Pat. No. 5,370,905, incorporated herein by reference. Further, when such compositions are used to bond glass substrates to painted substrates, such as for instance, window installation in vehicle manufacturing, the lap shear strength of the bonded substrate may be less than desirable for safety or structural purposes. Consequently, a separate paint primer comprising a solution of one or more silanes and/or isocyanate compounds is often applied to a painted substrate prior to the application of the composition in most vehicle assembly operations for bonding the windshield and the rear window.

In order for a primer and adhesive system to be commercially viable, that system must provide a durable bond. "Durable bond" means that the adhesive holds the window into the structure for a period of years. As the structure to which window glass or plastic coated with an abrasion resistant coating is traditionally bonded lasts for a significant number of years, it is expected that the bond holding the glass or coated plastic into a structure also last a significant number of years.

Adhesive systems utilized in bonding glass into structures often contain fillers. Fillers are added for a variety of reasons including to reduce the cost of the adhesive, to add strength or to color the adhesive. The problem is that if too much filler is added, the inherent properties of the adhesive can be compromised. The conventional wisdom is that the initial strength and the long term adhesion to substrates is reduced to unacceptable levels if large amounts of fillers are utilized in such adhesives.

It would be desirable to provide a composition which contains high levels of fillers which provides a bonded structure with lap shear strengths which meet industry standards and which allows for durable adhesion of the composition to the substrate surfaces.

SUMMARY OF THE INVENTION

In one aspect, the invention is a composition comprising:
(A) one or more urethane prepolymers having isocyanate moieties;
(B) a catalytic amount of one or more compounds containing one or more tertiary amine groups;
(C) carbon black; and
(D) untreated calcium carbonate in an amount of about 20 to about 50 percent by weight based on the total weight of the composition.

The compositions of the invention are useful for bonding two or more substrates together. In a preferred embodiment, the compositions of the invention are useful for bonding glass or coated plastic to a substrate. Preferably, the glass or coated plastic is shaped into a window and the substrate is a window flange of a structure such as a building or an automobile.

In another embodiment, the invention is a method for bonding two or more substrates together which comprises contacting a composition according to the invention with one or more of the substrates and contacting the two or more substrates with the composition of the invention disposed between the substrates and thereafter allowing the composition to cure so as to bond the substrate together.

The compositions of the invention are useful in bonding glass, plastic, metal, fiberglass and composite substrates which may or may not be coated or painted. The composition gives lap shear strengths which meet industry standards and provides durable bonds.

DETAILED DESCRIPTION OF THE INVENTION

The prepolymers used in the invention can be conventional prepolymers used in polyurethane adhesive compositions. Preferable urethane prepolymers for use in preparing the composition of the invention include any prepolymer having an average isocyanate functionality of at least about 2.0 and a molecular weight (weight average) of at least about 2,000. Preferably, the average isocyanate functionality of the prepolymer is at least about 2.2, and is more preferably at least about 2.4. Preferably, the isocyanate functionality is no greater than about 4.0, more preferably no greater than about 3.5 and most preferably no greater than about 3.0. Preferably, the weight average molecular weight of the prepolymer is at least about 2,500 and is more preferably at least about 3,000; and is preferably no greater than about 40,000, even more preferably no greater than about 20,000, more preferably no greater than about 15,000 and is most preferably no greater than about 10,000. The prepolymer may be prepared by any suitable method, such as by reacting an isocyanate-reactive compound containing at least two isocyanate-reactive, active hydrogen containing groups with an excess over stoichiometry of a polyisocyanate under reaction conditions sufficient to form the corresponding prepolymer.

Preferable polyisocyanates for use in preparing the prepolymer include any aliphatic, cycloaliphatic, araliphatic, heterocyclic or aromatic polyisocyanate, or mixtures thereof. Preferably, the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and most preferably no greater than about 3.0. Higher functionality may also be used, but may cause excessive cross-linking, and result in an adhesive which is too viscous to handle and apply easily, and can cause the cured adhesive to be too brittle. Preferably, the equivalent weight of the polyisocyanate is at least about 80, more preferably at least about 110, and is most preferably at least about 120; and is preferably no greater than about 300, more preferably no greater than about 250, and most preferably no greater than about 200.

Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanate has the isocyanate groups bonded directly to aromatic rings. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocylohexyl)methane, and trimethyl hexamethylene diisocyanate. The most preferred isocyanate is diphenylmethane diisocyanate.

The term "isocyanate-reactive compound" as used herein includes any organic compound having at least two isocyanate-reactive moieties, such as a compound containing an active hydrogen moiety, or an imino-functional compound. For the purposes of this invention, an active hydrogen containing moiety refers to a moiety containing a hydrogen atom which, because of its position in the molecule, displays significant activity according to the Zerewitnoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate reactive compound is a polyol, and is more preferably a polyether polyol.

Preferable polyols useful in the preparation of the prepolymers include those disclosed in Wu, U.S. Pat. No. 6,512,033 at column 4, line 10 to line 64, incorporated herein by reference, and include, for example, polyether polyols, polyester polyols, poly(alkylene carbonate)polyols, hydroxyl containing polythioethers, polymer polyols (dispersions of vinyl polymers in such polyols, commonly referred to as copolymer polyols) and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or a mixture thereof. In the embodiment where a mixture of alkylene oxide units is contained in a polyol, the different units can be randomly arranged or can be arranged in blocks of each alkylene oxides. In one preferred embodiment, the polyol comprises propylene oxide chains with ethylene oxide chains capping the polyol. In a preferred embodiment, the polyols are a mixture of diols and triols. Preferably, the isocyanate-reactive compound has a functionality of at least about 1.5, more preferably at least about 1.8, and is most preferably at least about 2.0; and is preferably no greater than about 4.0, more preferably no greater than about 3.5, and is most preferably no greater than about 3.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500.

Preferably, the prepolymers useful in the invention demonstrate the viscosity sufficient to allow the use of the prepolymers in adhesive formulations. Preferably, the prepolymers as prepared demonstrate a viscosity of about 6,000 centipoise (600 N-S/m$^2$) or greater and more preferably about 8,000 centipoise (800 N-S/m$^2$) or greater. Preferably, the polyurethane prepolymers demonstrate a viscosity of about 30,000 centipoise (3,000 N-S/m$^2$) or less and more preferably about 20,000 centipoise (2,000 N-S/m$^2$) or less. Above about 30,000 centipoise (3,000 N-S/m 2), the polyurethane compositions become too viscous to pump and therefore cannot be applied using conventional techniques. Below about 6,000 centipoise (600 N-S/m$^2$), the prepolymers do not afford sufficient integrity to allow the compositions utilizing the prepolymers to be utilized in desired applications. "Viscosity" as used herein is measured by the Brookfield Viscometer, Model DV-E with a RV spindle #5 at a speed of 5 revolutions per second and at a temperature of 25° C.

The amount of isocyanate containing compound used to prepare the prepolymer is that amount that gives the desired properties, that is, the appropriate free isocyanate content and viscosities as discussed hereinbefore. Preferably, the isocyanates are used to prepare in the prepolymer in an amount of about 6.5 parts by weight or greater, more preferably about 7.0 parts by weight or greater and most preferably about 7.5 parts by weight or greater. Preferably, the polyisocyanates used to prepare the prepolymer are used in an amount of about 12 parts by weight or less, more preferably 10.5 about parts by weight or less and most preferably about 10 parts by weight or less.

"One or more" as used herein means that at least one, and more than one, of the recited components may be used as disclosed. "Nominal" as used with respect to functionality means the theoretical functionality, generally this can be calculated from the stoichiometry of the ingredients used. Generally, the actual functionality is different due to imperfections in raw material, incomplete conversion of the reactants and formation of by-products.

The polyols are present in an amount sufficient to react with most of the isocyanate groups of the isocyanates leaving enough isocyanate groups to give the desired free isocyanate content of the prepolymer. Preferably, the polyols are present in an amount of about 30 parts by weight or greater based on the weight of the prepolymer, more preferably about 35 parts by weight or greater and most preferably about 40 parts by weight or greater. Preferably, the polyols are present in an amount of about 75 parts by weight or less based on the weight of the prepolymer, more preferably about 65 parts by weight or less and most preferably about 60 parts by weight or less.

The prepolymer may be prepared by any suitable method, such as bulk polymerization and solution polymerization. The reaction to prepare the prepolymer is carried out under anhydrous conditions, preferably under an inert atmosphere such as a nitrogen blanket and to prevent crosslinking of the isocyanate groups by atmospheric moisture. The reaction is preferably carried out at a temperature between about 0° C. and about 150° C., more preferably between about 25° C. and about 90° C., until the residual isocyanate content determined by titration of a sample is very close to the desired theoretical value. The isocyanate content in the prepolymers is preferably about 0.1 percent by weight or greater, more preferably about 1.5 percent by weight or greater and most preferably about 1.8 percent by weight or greater. The isocyanate content in the prepolymers is preferably about 10 percent by weight or less, more preferably about 5 percent by weight or less and most preferably 3 percent by weight or less. "Isocyanate content" means the weight percentage of isocyanate moieties to the total weight of the prepolymer.

The reactions to prepare the prepolymer may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally between about 0.005 and about 5 parts by weight of the mixture catalyzed, depending on the nature of the isocyanate.

The prepolymer is present in the composition of the invention in a sufficient amount such that the adhesive is capable of bonding substrates together. Preferably, the polyurethane prepolymer is present in an amount of about 40 parts by weight or greater based on the weight of the composition, more preferably about 45 parts by weight or greater and most preferably about 50 parts by weight or greater. Preferably, the polyurethane prepolymer is present in an amount of about 70 parts by weight or less based on the weight of the sealant, more preferably about 65 parts by weight or less and most preferably about 60 parts by weight or less.

The composition of the invention also comprises carbon black to give the composition the desired black color, viscosity and sag resistance. One or more carbon blacks may be used in the composition. The carbon black used in this invention may be a standard carbon black which is not specially treated to render it nonconductive. Standard carbon black is carbon black which is not specifically surface treated or oxidized. One or more nonconductive carbon blacks may be used in conjunction with the standard carbon black, although such inclusion may add unnecessary costs. The amount of carbon black in the composition is that amount which provides the desired color, viscosity, and sag resistance. The carbon black is preferably used in the amount of about 10 parts by weight or greater based on the 100 parts by weight of the composition, more preferably about 12 parts by weight or greater and most preferably about 14 parts by weight or greater. The carbon black is preferably about 35 parts by weight or less based on 100 parts by weight of the composition, more preferably about 30 parts by weight or less and most preferably about 25 parts by weight or less. Standard carbon blacks are well known in the art and include RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and Printex™ 30 carbon black available from Degussa. Nonconductive carbon blacks are well known in the art and include Raven™ 1040 and RAVEN™ 1060 carbon black available from Colombian.

The composition of the invention further comprises calcium carbonate. Calcium carbonate functions as a filler in the composition. Calcium carbonates useful in this invention are standard calcium carbonates. Such standard calcium carbonates are untreated, that is, they are not modified by treatment with other chemicals, such as organic acids or esters of organic acids. Calcium carbonates are present in a sufficient amount such that the desired adhesive properties of the composition are achieved. Preferably, the calcium carbonates are present in an amount of about 20 parts by weight or greater, even more preferably about 25 parts by weight or greater and most preferably about 30 parts by weight or greater. Preferably, the calcium carbonate is present in an amount of about 50 parts by weight or less, more preferably about 40 parts by weight or less and most preferably about 37 parts by weight or less.

The adhesive also contains a catalyst containing one or more tertiary amine groups which catalyzes the reaction of isocyanate moieties with water or an active hydrogen containing compound. Such compounds are well known in the art. The catalyst can be any catalyst containing one or more tertiary amine groups known to the skilled artisan for the reaction of isocyanate moieties with water or active hydrogen containing compounds. Among preferred tertiary amine containing catalysts include dimorpholinodialkyl ethers, a di((dialkylmorpholino)alkyl)ethers, substituted morpholine compounds, N-dialkyl amino alkyl ethers and alkyl substituted polyalkylene polyamines. Among preferred tertiary amines are bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. A preferred class of catalyst is dimorpholino dialkyl ethers wherein the morpholine groups may be substituted with groups which do not interfere in the catalytic affect of the catalyst. A preferred dimorpholinodialkyl ether is dimorpholinodiethyl ether. A preferred di((dialkylmorpholino)alkyl)ether is (di-(2-(3,5-dimethylmorpholino)ethyl)ether). Tertiary amines are employed in an amount sufficient to catalyze the reaction of isocyanate groups with active hydrogen containing compounds and/or water, preferably the tertiary amines are utilized in amounts based on the weight of the composition, of about 0.15 parts by weight or greater and most preferably about 0.2 parts by weight or greater and about 2.0 parts by weight or less, more preferably about 1.75 parts by weight or less, even more preferably about 1.0 part by weight or less and most preferably about 0.7 parts by weight or less.

For formulating the compositions of the invention, the one or more prepolymers, carbon black, calcium carbonate, one or more tertiary amine catalysts are combined, preferably with other fillers and additives known in the prior art for use in elastomeric compositions. By the addition of such materials, physical properties such as viscosity, flow rate, sag, and the like can be modified. However, to prevent premature reaction of the moisture sensitive groups of the polymer, the filler is preferably thoroughly dried before admixture therewith. Exemplary filler materials and additives include materials such as titanium dioxide, clays, surface treated silicas, ultraviolet stabilizers, antioxidants, and the like. This list, however, is not comprehensive and is given merely as illustrative.

The composition of the invention also preferably contains one or more plasticizers or solvents to modify rheological properties to a desired consistency. Such materials should be free of water, inert to isocyanate groups and compatible with the prepolymer. Such material may be added to the reaction mixtures for preparing the prepolymer, or to the mixture for preparing the final adhesive composition, but is preferably added to the reaction mixtures for preparing the prepolymer and the adduct, so that such mixtures may be more easily mixed and handled. Suitable plasticizers and solvents are well known in the art and include straight and branched alkylphthalates, such as diisononyl phthalate, dioctyl phthalate and dibutyl phthalate, a partially hydrogenated terpene commercially available as "HB-40", trioctyl phosphate, epoxy plasticizers, toluene-sulfamide, chloroparaffins, adipic acid esters, castor oil, xylene, 1-methyl-2-pyrrolidinone and toluene. The amount of plasticizer used is that amount sufficient to give the desired rheological properties and disperse the components in the composition of the invention. Preferably, the plasticizer is present in the compositions of the invention in an amount of about 0 part by weight or greater, more preferably about 5 parts by weight or greater and most preferably about 10 parts by weight or greater The plasticizer is preferably present in an amount of about 35 parts by weight or less and most preferably about 30 parts by weight or less.

The composition of the invention may be formulated by blending the components together using means well known in the art. Generally, the components are blended in a suitable mixer. Such blending is preferably conducted in an inert atmosphere and in the absence of atmospheric moisture to prevent premature reaction. It may be advantageous to add any plasticizers to the reaction mixture for preparing the isocyanate containing prepolymer so that such mixture may be easily mixed and handled. Alternatively, the plasticizers can be added during blending of all the components. Once the composition is formulated, it is packaged in a suitable container such that it is protected from atmospheric moisture. Contact with atmospheric moisture could result in premature cross-linking of the prepolymer utilized in the compositions of the invention.

The composition of the invention is used to bond porous and nonporous substrates together. The composition is applied to a first substrate and the composition on the first substrate is thereafter contacted with a second substrate. Thereafter, the composition is exposed to curing conditions. In a preferred embodiment, one substrate is glass or clear plastic coated with an abrasion resistant coating and the other substrate is a plastic, metal, fiberglass or composite substrate which may optionally be painted or coated. The plastic coated with an abrasion resistant coating can be any plastic which is clear, such as polycarbonate, acrylic, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or coated plastic window has an opaque coating disposed in the region to be contacted with the adhesive to block UV light from reaching the adhesive. This is commonly referred to as a frit. Preferably, the opaque coating is an inorganic enamel or an organic coating.

In a preferred embodiment, the composition of the invention is applied to the surface of the glass or coated plastic, along the portion of the glass or coated plastic which is to be bonded to the structure. The composition is thereafter contacted with the second substrate such that the composition is disposed between the glass or coated plastic and the second substrate. The composition is allowed to cure to form a durable bond between the glass or coated plastic and the substrate. Generally, the compositions of the invention are applied at an ambient temperature in the presence of atmospheric moisture. Exposure to atmospheric moisture is sufficient to result in curing of the composition. Curing may be further accelerated by applying heat to the curing composition by means of convection heat, or microwave heating. In another embodiment, the composition may be applied to the surface of the other substrate and then contacted with the glass or coated plastic as described.

Working time is the time period after application to a substrate wherein the composition is sufficiently tacky to be applied to the surface of a second substrate to bond with the second substrate. Preferably, the composition of the invention is formulated to provide a working time of about 6 minutes or greater and more preferably about 10 minutes or greater. Preferably, the working time is about 20 minutes or less and more preferably about 15 minutes or less.

In reference to polyurethane prepolymers, average isocyanate functionality is determined according to Bhat, U.S. Pat. No. 5,922,809 at column 12, line 65 to column 13, line 26, incorporated herein by reference. Molecular weights as described herein are determined according to the following procedure disclosed in Bhat, U.S. Pat. No. 5,922,809 at column 12, lines 50 to 64, incorporated herein by reference. "Parts by weight" refer to compositions which comprise 100 parts total.

The adhesion performance of an adhesive is evaluated by a lap shear adhesion test. Preferably, the lap shear strength of the compositions of the invention after cure under 23° C. and 50 percent relative humidity for 7 days is about 250 psi (1.72 mPa), more preferably 350 psi (2.40 mPa) and most preferably about 400 psi (2.76 mPa). Testing in a Weather-O-Meter (WOM) chamber is often used to accelerate the aging testing of weathering of the sample. SAE J1885 conditions are used here unless specified otherwise.

Parts by weight as used herein refers to 100 parts by weight of the composition specifically referred to. In most cases, this refers to the adhesive composition of this invention.

SPECIFIC EMBODIMENTS OF INVENTION

The following examples are included for illustrative purposes only and are not intended to limit the scope of the invention. Unless otherwise stated, all parts and percentages are by weight.

Ingredients:

Stannous octoate is a catalyst.

Diisononyl phthalate is a plasticizer.

JEFFCAT™ DMDEE catalyst is dimorpholino diethyl ether available from Huntsman Chemical.

ELFTEX™ S7100 standard carbon black of Cabot.

HUBERCARB™ Q325 untreated calcium carbonate.

BETASEAL™ 43518 primer is an organosilane containing clear glass primer available from The Dow Chemical Company.

BETASEAL™ 43520A primer is an isocyanate containing glass primer further containing carbon black available from The Dow Chemical Company.

BETASEAL™ 43526 primer is a silane containing glass primer available from The Dow Chemical Company.

BETASEAL™ 43533ATU primer is an isocyanate containing painted flange primer available from The Dow Chemical Company BETAPRIME™ 5500 primer is an isocyanate and silane containing glass primer available from The Dow Chemical Company.

Preparation of Isocyanate Functional Prepolymer

Into a 4-liter kettle equipped with an agitator and a heating jacket is charged 363.68 grams of a molecular weight 2000 polypropylene oxide diol, 527.04 grams of molecular weight 4500 polypropylene oxide triol and 32 grams of diisononyl phthalate under nitrogen protection. The reactants are mixed and heated under nitrogen until the mixture reached 54° C. Once the mixture reached 54° C., 160.64 grams of methylene diphenyl diisocyanate stored at 45° C. is added and mixed in. Then, 0.08 g of stannous octoate was added dropwise and slowly. The reaction exothermed and after the reaction temperature peaked, the reaction is held between 80° C. and 85° C. for 30 minutes. Then, the temperature set point on heating unit is set at 60° C. Thereafter, 501.20 grams of diisononyl phthalate and 15.36 grams of diethyl malonate are added. The mixture is agitated for 60 minutes. Thereafter, the resulting prepolymer is packaged in an air tight container. The prepolymer has a viscosity of 11160 centipoise (25° C.) and an isocyanate percentage in the prepolymer is 1.49 percent by weight.

Preparation of Adhesive Compositions

The adhesive compositions are prepared by adding the stated amount of prepolymer, diisononyl phthalate and dimorpholino diethyl ether into a 2 gallon mixer. The mixture is degassed under vacuum and mixed for 15 minutes. Then, the vacuum is broken with nitrogen. The dried carbon black and $CaCO_3$ are added. The vacuum was applied slowly. When half of the vacuum was achieved, mixing is started to wet out the fillers for 2 minutes. The vacuum valve is then fully opened and mixing is continued under full vacuum for 15 minutes. Thereafter, mixture is scraped down and the full vacuum is applied again before additional mixing. The mixture is mixed under vacuum for another 10 minutes. Then, vacuum is broken with nitrogen and the adhesive composition is packaged into sealed tubes.

Test Procedures

Viscosities of prepolymers as described herein are determined according to the procedure disclosed in Bhat, U.S. Pat. No. 5,922,809 at column 12, lines 38 to 49, incorporated herein by reference. Viscosities of adhesives as described herein are determined using press flow. The press flow is the time it takes for 20 grams of adhesive to pass through a 0.104 in. (2.6 mm) orifice at 60 psi (413 kPa) pressure. 3 day-54° C. heat age growth of the adhesive is defined as the press flow increase after 3 day-54° C. heat treatment on the adhesive divided by the initial press flow of the adhesive.

Molecular weights as described herein are determined according to the following procedure disclosed in Bhat, U.S. Pat. No. 5,922,809 at column 12, lines 50 to 64, incorporated herein by reference.

Tack-free time of the adhesive compositions is measured according to the following test procedure. A 150 mm long and 6 mm diameter adhesive bead is laid on a release paper under conditions of 23° C., 50 percent relative humidity. The bead is touched gently using a polyethylene film and the time when the bead is tack free and the polyethylene film is clean from the contact of the bead is recorded.

Peel test is run as described in this paragraph. A triangle bead of 6.3 mm (base)×12 mm (height)×100 mm (length) size is placed on the tested substrate and is pressed to a height of 3 mm with a release paper. The peel test is run after the initial cure under 23° C. and 50 percent RH (relative humidity) for a specific time period and any further environmental exposure. When tested, a slit (20-40 mm) is cut between the adhesive end and the substrate. The cured bead is then cut with a razor blade through to the tested substrate at a 60 degree angle while pulling back the end of the bead at >90 degree angle. Notches are cut about every 3-5 mm on the substrate. The degree of adhesion is evaluated as adhesive failure (AF) and/or cohesive failure (CF). In case of AF, the cured bead can be separated from the tested substrate surface, while in CF separation occurs within the sealant adhesive as a result of cutting and pulling.

The lap shear test is performed according to SAE J1529 test procedure which is described below. A triangle bead of adhesive composition approximately 6.3 mm base and 8 mm height is applied along the width of the 25 mm by 100 mm primed glass coupon and about 6.3 mm away from the glass coupon end. The second substrate which can be either primed or not is immediately pressed on the adhesive bead to give a final height of 6.3 mm for the composition in between. The sample is allowed to cure under conditions of 23° C. and 50 percent relative humidity (RH) for 7 days unless specified otherwise. The sample is then pulled right away or after more environmental exposures at a rate of 2 inch/minute (50 mm/min) with an Instron Tester. The load (lbs) at sample break divided by the sample area (in 2) gives the lap shear adhesion strength (psi). The degree of adhesion is evaluated as adhesive failure (AF) and/or cohesive failure (CF). In case of AF, the cured bead is separated from the substrate and in CF separation occurs only within the adhesive bead as a result of testing.

The sag test is carried out using the following procedure below. A metal panel of 10 cm height and 30 cm long is placed vertically on the bench. A right angle bead of adhesive compositions with 1.8 cm height and 0.62 cm base is dispensed along the top edge of the panel. After 30 minutes, the sag at the tip of the adhesive composition is measured and recorded.

The compositions and the test results are compiled in the following tables.

Sample Preparation and Testing

Peel samples are prepared with the adhesive compositions above. Substrates for peels included the following: Substrate A; clear float glass (2.5 cm by 15 cm) primed with BETASEAL™ 43518 and BETASEAL™ 43520A primers;

Substrate B: clear float glass wiped with isopropyl alcohol and primed with BETASEAL™ 43526 primer, and Substrate C: an e-coat steel coupon (2.5 cm width by 10 cm length) primed with BETASEAL™ 43533ATU primer. These peels are tested after the following conditions and results are compiled in the Peel Test table.

Condition 1: 7 days of initial cure at 23° C. and 50 percent relative humidity and then 1000 hours exposure in the SWOM chamber (sunshine weatherometer).

Condition 2: 7 days cure under 23° C. and 50 percent relative humidity and then soaked in water for 10 days at 60° C.

Condition 3: 7 days of cure at 23° C. and 50 percent relative humidity.

Condition 4: 7 days of cure at 23° C. and 50 percent relative humidity and then exposed to 100° F. (38° C.) and 100 percent relative humidity for 14 days.

Condition 5: 7 days of cure at 23° C. and 50 percent relative humidity and then exposed to weatherometer for 2000 hours according to SAE J1885 conditions.

TABLE 1

Formulations

| | Adhesive Composition | | | | |
|---|---|---|---|---|---|
| | 1 | 2 | 3 | 4 | 5 |
| | $CaCO_3$ % loading | | | | |
| Ingredients | 17% gm | 23% gm | 28.00% gm | 34.00% gm | 40.00% gm |
| Prepolymer | 890.88 | 875.20 | 819.20 | 828.16 | 732.16 |
| Diisononyl Phthalate | 144.00 | 96.00 | 96.00 | 0.00 | 0.00 |
| JEFFCAT ™ DMDEE | 5.12 | 4.80 | 4.80 | 3.84 | 3.84 |
| Carbon Black | 288.00 | 256.00 | 232.00 | 224.00 | 224.00 |
| $CaCO_3$ | 272.00 | 368.00 | 448.00 | 544.00 | 640.00 |
| Total Weight, gram | 1600.00 | 1600.00 | 1600.00 | 1600.00 | 1600.00 |

TABLE 2

Physical Properties

| Property | Composition | | | | |
|---|---|---|---|---|---|
| | 1 | 2 | 3 | 4 | 5 |
| Specific Gravity | 1.25 | 1.29 | 1.34 | 1.41 | 1.48 |
| Press Flow Viscosity 0.104"/60 psi | | | | | |
| Initial (Second) | 32, 31 | 34, 33 | 32, 31 | 74, 74 | 169, 170 |
| 3d-54 C. (Second) | 37, 36 | 40, 39 | 37, 37 | 85, 86 | 184 |
| Heat Age Growth (%) | 16% | 18% | 18% | 16% | 8.6% |
| Tack Free Time, 23 C./50% RH (min) | 25 | 23 | 22 | 22 | 25 |
| Initial Sag, (mm) | 0 | 0 | 0 | 0 | 0 |
| Physical Properties | | | | | |
| Tensile Strength. (Kpa) | 6914 | 6588 | 5887 | 5977 | 5895 |
| Elongation (%) | 613 | 604 | 592 | 522 | 488 |
| Hardness (shore A) | 55 | 58 | 58 | 67 | 71 |

Peel Test Table

| Test | Composition | | | | |
|---|---|---|---|---|---|
| | 1 | 2 | 3 | 4 | 5 |
| Peel on substrate A: | | | | | |
| Condition 1 | 45 CF/55 AF | 30 CF/70 AF | 35CF/65AF | 100 CF | |
| Condition 3 | | | | 100 CF | |
| Condition 4 | | | | 100 CF | |
| Peel on substrate B: | | | | | |
| Condition 1 | 20 CF/80 AF | 20 CF/80 AF | 5CF/95AF | 100 CF | |
| Condition 2 | | 70 CF/30 AF | | 100 CF | 100 CF |
| Peel on substrate C: | | | | | |
| Condition 2 | | 100 CF | | 100 CF | 100 CF |
| Condition 3 | | | | 100 CF | |
| Condition 4 | | | | 100 CF | |

CF: cohesive failure within the adhesive bead.
AF: Adhesion failure of the adhesive bead to the tested substrate.

Lap shear samples are tested after the conditions described above. Lap shear data is reported from an average of three samples per adhesive composition per condition except the WOM test where an average of 5 samples is used. All lap shear results are included in the Lap Shear Test table.

Lap shear samples are prepared from these adhesive compositions. In the lap shear preparation, following substrates are used. Substrate D is a glass coupon (width 2.5 cm by length 7.5 cm) having a bismuth-zinc sag bent frit disposed on the tested surface which is wiped with isopropyl alcohol and primed with BETASEAL™ 43526 primer. Substrate E is a glass coupon having an bismuth-zinc sag bent frit disposed on the tested surface which is wiped with isopropyl alcohol and primed with BETAPRIME™ 5500 primer. Substrate F is a BETASEAL™ 43533ATU primed polyvinyl chloride and Substrate G is a unprimed electro-coated coupon (2.5 cm width by 10 cm length).

Lap Shear Test Table

| Test | Composition | | | | |
|---|---|---|---|---|---|
| | 1 | 2 | 3 | 4 | 5 |
| Lap Shear of substrates C and D | | | | | |
| Condition 3, psi (mPa) Failure mode | 733 (5.05) (100 CF) | 640 (4.41) (100 CF) | 453 (3.12) (100 CF) | 407 (2.81) (100 CF) | 365 (2.52) (100 CF) |
| Condition 4, psi (mPa) Failure mode | 875 (6.03) (100 CF) | 786 (5.42) (100 CF) | | 474 (3.27) (100 CF) | 391 (2.70) (100 CF) |
| Condition 5, psi (mPa) Failure mode | 657 (4.53) (84 CF/16 AF-PU/GP) | 675 (4.65) (71 CF/29 AF-PU/GP) | | 483 (3.33) (100 CF) | 390 (2.69) (100 CF) |
| Lap Shear of substrates C and E | | | | | |
| Condition 5, psi (mPa) Failure mode | | 492 (3.39) (100 CF) | | 480 (3.31) (100 CF) | 388 (2.68) (100 CF) |
| Lap Shear of substrates F and G | | | | | |
| Condition 3, psi (mPa) Failure mode | | 322 (2.22) (100 CF) | | 271 (1.87) (100 CF) | |
| Condition 4, psi (mPa) Failure mode | | 372 (2.56) (100 CF) | | 341 (2.35) (100 CF) | |

CF: cohesive failure within the adhesive bead.
AF-PU/GP: Adhesion failure of the adhesive bead to the glass primer.

A sample of a commercially available adhesive from Shenzhen AO-BO comprising 29.74 percent of a polyether based isocyanate functional polyurethane prepolymer, 20.47 percent of alkyl phthalate, 4.50 percent of toluene, 18.56 percent of carbon black, 0.49 percent of Silane A-187, 0.0097 percent of a tin catalyst and 26.24 percent of calcium carbonate having a specific gravity of 1.353 is tested as described below. Peel samples are prepared with this adhesive on the following substrates A, B and C. These peel samples are tested after Condition 2 (7 days of cure at 23° C. and 50 percent relative humidity and then soaked in water for 10 days at 60° C.). All these peel samples demonstrated 100 percent adhesive failure (100AF) to the tested substrates.

What is claimed is:

1. A composition comprising:
   (A) from about 40 parts to about 70 parts by weight of one or more urethane prepolymers having isocyanate moieties;
   (B) a catalytic amount of from about 0.15 parts by weight to about 2.0 parts by weight of one or mere compounds containing one or more tertiary amine groups;
   (C) from about 10 to about 35 parts by weight of carbon black;
   (D) from about 30 to about 40 parts by weight of untreated calcium carbonate;
   wherein the amounts are based on the total weight of the composition.

2. A con position according to claim 1 wherein the one or more compounds containing one or more tertiary amine groups is one or more dimorpholino dialkyl ethers wherein the morpholino groups may be substituted with groups which do not interfere in the catalytic effect of the one or more compounds containing one or more tertiary amine groups.

3. A composition according to claim 2 wherein the one or more compounds containing one or more tertiary amine groups is dimorpholino diethylether.

4. A composition according to claim 1 wherein the one urethane prepolymers is derived from a polyol containing alkylene oxide units of ethylene oxide, propylene oxide or mixtures thereof.

5. A composition according to claim 1 wherein the one or more urethane prepolymers is derived from an aromatic isocyanate.

6. A composition according to claim 5 wherein the one or more urethane prepolymers is derived from methylene diphenyl diisocyanate.

7. A composition according to claim 1 wherein the composition further comprises one or more plasticizers.

8. A composition according to claim 1 wherein form about 10 to about 25 parts by weight of carbon black is present.

9. A composition according to claim 8 wherein the amount of the untreated calcium carbonate is 34 to 40 parts by weight.

10. A composition according to claim 9 wherein the catalyst is a dimorpholino dialkyl ether.

11. A method of bonding glass or an abrasion resistant coating coated plastic to a substrate which comprises applying a composition according to claim 1 to the glass or coated plastic surface or the substrate surface; contacting the glass or coated plastic and substrate such that the composition is located between the glass or coated plastic and the substrate; allowing the composition to cure so as to bond the glass or coated plastic to the substrate.

12. A method according to claim 11 wherein the glass to which the adhesive is bonded has a ceramic frit coated on the surface and the substrate surface has a coating thereon.

13. A method according to claim 12 wherein the glass is primed and the coated substrate surface is either primed or unprimed.

14. A method according to claim 12 wherein the substrate is an automobile and the glass or coated plastic is adapted for use as a window.

15. A method according to claim 11 wherein the one or more compounds containing one or more tertiary amine groups is dimorpholino diethylether.

16. A method according to claim 11 wherein from about 10 to about 25 parts by weight of carbon black is present.

* * * * *

UNITED STATES PATENT AND TRADEMARK OFFICE
CERTIFICATE OF CORRECTION

| | | |
|---|---|---|
| PATENT NO. | : 9,102,854 B2 | Page 1 of 1 |
| APPLICATION NO. | : 12/249030 | |
| DATED | : August 11, 2015 | |
| INVENTOR(S) | : Huide D. Zhu | |

It is certified that error appears in the above-identified patent and that said Letters Patent is hereby corrected as shown below:

In the Claims

Column 13, Line 28, "con position" should be "composition"

Column 13, Line 37, after "the one", insert --or more--

Signed and Sealed this
Twelfth Day of January, 2016

Michelle K. Lee
*Director of the United States Patent and Trademark Office*